(12) United States Patent
Mäkelä et al.

(10) Patent No.: US 7,336,661 B2
(45) Date of Patent: Feb. 26, 2008

(54) TRANSMITTING PACKET DATA

(75) Inventors: Tero Mäkelä, Helsinki (FI); Julius Karlsson, Helsinki (FI); Tuomo Notkola, Helsinki (FI)

(73) Assignee: Nokia Corporation, Espoo (FI)

( * ) Notice: Subject to any disclaimer, the term of this patent is extended or adjusted under 35 U.S.C. 154(b) by 1004 days.

(21) Appl. No.: 10/239,230

(22) PCT Filed: Jan. 16, 2001

(86) PCT No.: PCT/EP01/00465

§ 371 (c)(1),
(2), (4) Date: Feb. 19, 2003

(87) PCT Pub. No.: WO01/74027

PCT Pub. Date: Oct. 4, 2001

(65) Prior Publication Data
US 2003/0152097 A1 Aug. 14, 2003

(51) Int. Cl.
*H04L 12/56* (2006.01)

(52) U.S. Cl. ............................ 370/395.1; 370/412

(58) Field of Classification Search ............ 370/395.1, 370/412, 235, 232, 230.1, 310, 441, 442, 370/444
See application file for complete search history.

(56) References Cited

U.S. PATENT DOCUMENTS 5,748,629 A * 5/1998 Caldara et al. ............. 370/389
5,870,629 A * 2/1999 Borden et al. ................. 710/44
6,072,772 A * 6/2000 Charny et al. ............... 370/229
6,262,986 B1 * 7/2001 Oba et al. .................... 370/399
6,389,019 B1 * 5/2002 Fan et al. ............... 370/395.42
6,434,160 B1 * 8/2002 Davis ......................... 370/412

FOREIGN PATENT DOCUMENTS

| WO | WO 97/14240 | 4/1997 |
|---|---|---|
| WO | WO 99/00949 | 1/1999 |
| WO | WO 99/05828 | 2/1999 |

OTHER PUBLICATIONS

Choi et al "Weighted Fair Queuing for Data Service in a Multimedia CDMA System" (Vehicular Technology Conference, Sep. 24-26, 2000).*
Bennett et al "WF2Q: Worse-case Fair Weighted Fair Queuing" (IEEE, 1996).*

(Continued)

*Primary Examiner*—Edan Orgad
*Assistant Examiner*—Lawrence J Burrowes
(74) *Attorney, Agent, or Firm*—Squire, Sanders & Dempsey, LLP

(57) ABSTRACT

The present invention related to handling of data units in a node of a communication system. The data units are distributed in a plurality of transmission queues based on priority parameters that associate with the data units. The queues are weighted such that the weight of a queue defines the relative share of resources allocated to said queue in relation to the resources that are to be allocated to the other queues. The assigned weights can be adjusted based on information of the amount of logical connections that associate with the respective queue.

22 Claims, 2 Drawing Sheets

OTHER PUBLICATIONS

Zhang et al "Rate-Controlled Service Disciplines" (Journal of High Speed Networking, 1994).*
Jiang et al "Providing Multiple Service Classes for bursty Data Traffic in Cellulat Networks" (IEEE INFOCOM, 2000).*

"*Technical Report of IEICE IN-99-138*", Mar. 9, 2000.
"Weighted Queueing Algorithm for Efficient Asynchronous Transfer Mode Traffic Shaping", IBM Technical Disclosure Bulletin, vol. 39, No. 04, Apr. 1996, pp. 161-163.

* cited by examiner

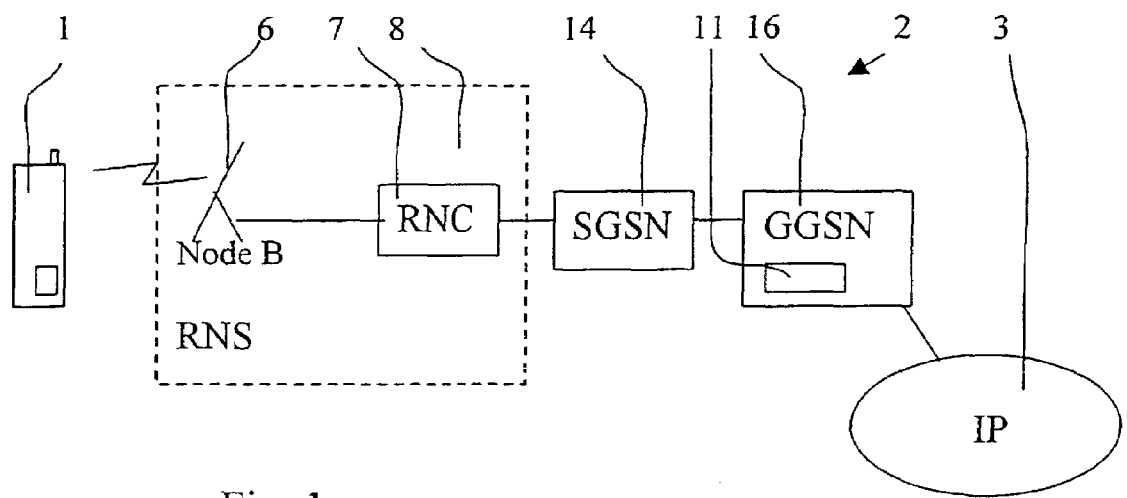
Fig. 1
Fig. 2
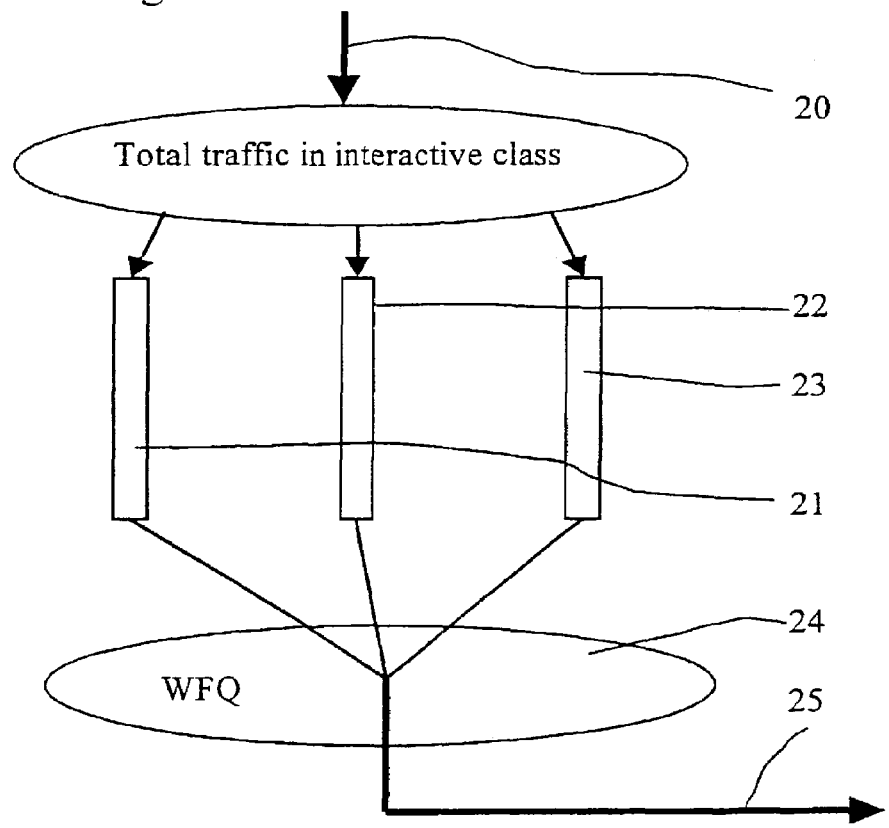

TRANSMITTING PACKET DATA

FIELD OF THE INVENTION

The present invention relates to transmission of packet data in a telecommunications system.

BACKGROUND OF THE INVENTION

Telecommunications networks typically operate in accordance with a given standard or specification which sets out what the various elements of the network are permitted to do and how that should be achieved. For example, the standard or specification may define whether the user, or more precisely, user equipment or terminal is provided with circuit switched and/or packet switched service. The standard or specification may also define the communication protocols and/or parameters which shall be used for the connection. In other words, the standards and/or specifications define the "rules" on which the communication can be based on. Examples of the different standards and/or specifications for wireless communication include, without limiting to these, specifications such as GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access) or TD/CDMA in UMTS (Time Division/Code Division Multiple Access in Universal Mobile Telecommunications System), IMT 2000 and so on.

In a typical wireless cellular communication system a base station serves mobile stations or similar terminal apparatus (mobile station MS in the GSM, User Equipment UE in the UMTS) via a wireless interface. Each of the cells of the cellular system can be served by an appropriate transceiver apparatus. For example, in the WCDMA radio access network the cell is served by Node B, which is connected to and controlled by an element called as a radio network controller (RNC) node. In the GSM radio network the cell is served by a base station (BTS), which is connected to and controlled by a base station controller (BSC) node. The BSC/RNC element may be connected to and controlled by a mobile switching center (MSC), a serving GPRS support node (SGSN) or similar facility. The controllers of a network are typically interconnected and there may be one or more gateways, such as a Gateway MSC (GMSC) or a Gateway GPRS support node (GGSN), for connecting the cellular network to other networks, such as to circuit or packet switched telephone or data networks, such as the Internet or an intranet. The gateway node provides one or several access points for the network to another network, that is a connection point between the two networks.

As mentioned above, the telecommunications network may be capable of providing wireless packet switched services. Examples of such networks include the GPRS (General Packet Radio Service) network, EDGE (enhanced data rate for GSM evolution) Mobile Data Network or an appropriate third generation telecommunication system such as the CDMA (code division multiple access) or TDMA (time division multiple access) based $3^{rd}$ generation telecommunication systems that are sometimes referred to as Universal Mobile Telecommunication System (UMTS). All these relate to the transfer of data to and from mobile stations. For example, the GPRS standard is provided in conjunction with the GSM (Global System for Mobile communications) standard. The GSM standard is a circuit switched service and is originally designed for speech services. There are elements of the GSM standard and the GPRS standard which are in common. The GPRS networks are described in more detail e.g. in 3GPP Technical Specification 3G TS 23.060 version 3.2.0, "General Packet Radio Service (GPRS); Service description; Stage 2", January 2000. This document is incorporated herein by reference. An adaptation of the GPRS standard is also being proposed for use with the third generation standard UMTS, which typically uses code division multiple access. The packet data part of the UMTS is contained in the above referenced 23.060 specification, i.e. 23.060 applies for packet switched data both for the UMTS and the GPRS.

The released GPRS and UMTS specifications specify four traffic classes (conversational, streaming, interactive and background) for the quality of service (QoS). The conversational class is indented for voice calls. The streaming class is indented for real-time traffic, such as for video-on-demand services. The interactive class may cover non-real time traffic with small delays, such as web browsing. The background class is for traffic that may tolerate greater delays, such as delays of 1 to 5 seconds.

The data may flow within each of the classes via different data flows i.e. data streams. For example, the current proposals for a QoS standard define the interactive traffic class and traffic handling priority parameters. In other words, the data traffic between different data flow paths in the interactive traffic class can be prioritised with another QoS parameter. This further QoS parameter will be referred to in the following as traffic handling priority.

When the end-user of a connection requests for data from a remote equipment (e.g. a server), the interactive class scheme may apply. The end-user may be a machine, a human and so on. Examples of the human interaction with the remote equipment include web browsing, data base retrieval, server access and so on. Examples of machines interaction with the remote equipment include polling for measurement records, automatic data base enquiries (telemachines) and so on.

Interactive traffic is a data communication scheme that on an overall level may be characterised by the request-response pattern of the end-user. At the message destination there is an entity expecting the message (response) within a certain time period. Round trip delay time is therefore one important attribute of the scheme. Another characteristic feature of the interactive traffic is that the content of the data packets must be transparently transferred. The transfer should also occur with as low bit error rate as possible.

The traffic handling priority may be defined as a feature that specifies the relative importance for handling of all service data units (SDUs) belonging e.g. to a UMTS bearer compared to the SDUs of other bearers. The service data units (SDUs) may comprise a data packet or any other data transmission entity that may be seen as forming a unit.

The data units may be transferred via the network as a Packet Data Protocol (PDP) context. More particularly, PDP context refers to the part of the data connection that goes through the packet switched network (e.g. the GPRS/UMTS network). The PDP context can be seen as a logical connection from the wireless station to the access point of a gateway node, such as the GGSN, the access point being the connection point between the e.g. GPRS/UMTS mobile network and an external data network. The PDP context may also be referred to, instead of the term logical connection, as a logical association between the access point and the user.

The purpose of the priority feature within the interactive class is to be able to differentiate between the different bearer qualities. This is handled by using a traffic handling priority attribute, to allow the mobile network to schedule traffic accordingly. By definition, the priority is an alternative to absolute guarantees, and thus these two attribute types may not be used together for a single bearer.

The number of the PDP contexts is continuously changing. The inventors have found that this may make it difficult to keep the relative priorities of the PDP contexts in the interactive traffic class during the configuration thereof. The prior art known to the inventors does not recognise or address the problem. The current specifications or proposals for the standards do not specify any manner how to accomplish the actual treatment of the data packets that belong to the PDP contexts i.e. logical connections or associations in the interactive traffic class and may have different traffic handling priorities.

The handling of the data packets, however, may need to be addressed before implementing the system in order to provide fair treatment of individual data flows. A possibility would be to use a WFQ (weighted fair queuing) to address the problem. However, the simple use of WFQs might neglect the number of the logical connections using each traffic handling priority. This might also lead to unfair behaviour in a congestion situation e.g. such that a PDP context with a lower traffic handling priority has a possibility of receiving better service than a PDP context with higher traffic handling priority. In other words, a PDP context with a higher priority might experience lower throughput than a PDP context with a lower priority if the number of PDP contexts with the higher priority exceeds a critical value. In addition, a fair treatment of the logical connections PDP contexts based on the traffic handling priorities, or other similar parameters, may also be desired since in some applications the end users may be charged based on (entirely or partially) said parameters.

SUMMARY OF THE INVENTION

It is an aim of the embodiments of the present invention to address one or several of the above problems.

According to one aspect of the present invention, there is provided a method of handling a plurality of data units in a node of a communication system, wherein the plurality of data units are distributed in the node in a plurality of transmission queues based on the priority of the data units, the method comprising: assigning weights to the queues of the plurality of transmission queues, the weight of a queue defining the share of resources that is to be allocated for the queue; and adjusting the assigned weight of a queue of the plurality of transmission queues based on information of the amount of logical connections that associate with said queue.

In a more specific embodiment the adjusting is accomplished by multiplying the weight of the queue by the number of the logical connections that associate with said queue. The transmission queues may also belong to an interactive traffic class of the quality of service classes. The number of data units that is to be transferred from a queue may be based on the relative weight of the queue. The adjusted weight of a queue of the plurality of transmission queues may indicate the number of data units that is to be transferred from said queue before transferring data units from a next queue. The weights may be adjusted dynamically. The weights may be adjusted during activation or deactivation of the logical connections.

According to another aspect of the present invention there is provided a node for a communication system, comprising: means for receiving a stream of data units, the data units associating with different priorities; means for distributing the data units into a plurality of transmission queues based on the priorities of the data units; means for assigning weights for the transmission queues, the weight of a queue defining the share of resources to be allocated for the queue; and means for adjusting the weight assigned to a queue based on information of the amount of logical connections that associate with the queue, wherein the node is adapted to transfer data units from the queues based on the adjusted weights.

The embodiments of the invention may enable fair treatment of the data packet contexts and maintenance of the desired relative priorities between the logical packet data connections in a traffic class regardless of the number of the packet data contexts within the class. The embodiments may also enable dynamic distribution of data forwarding resources in a node of a communication system.

BRIEF DESCRIPTION OF DRAWINGS

For better understanding of the present invention, and in order to show how the invention may be implemented in practice, reference will now be made by way of example to the accompanying drawings in which:

FIG. 1 shown a communication network in which the embodiments of the present invention may be used;

FIG. 2 shows an embodiment of the present invention; and

DESCRIPTION OF PREFERRED EMBODIMENTS OF THE INVENTION

Figure 3:
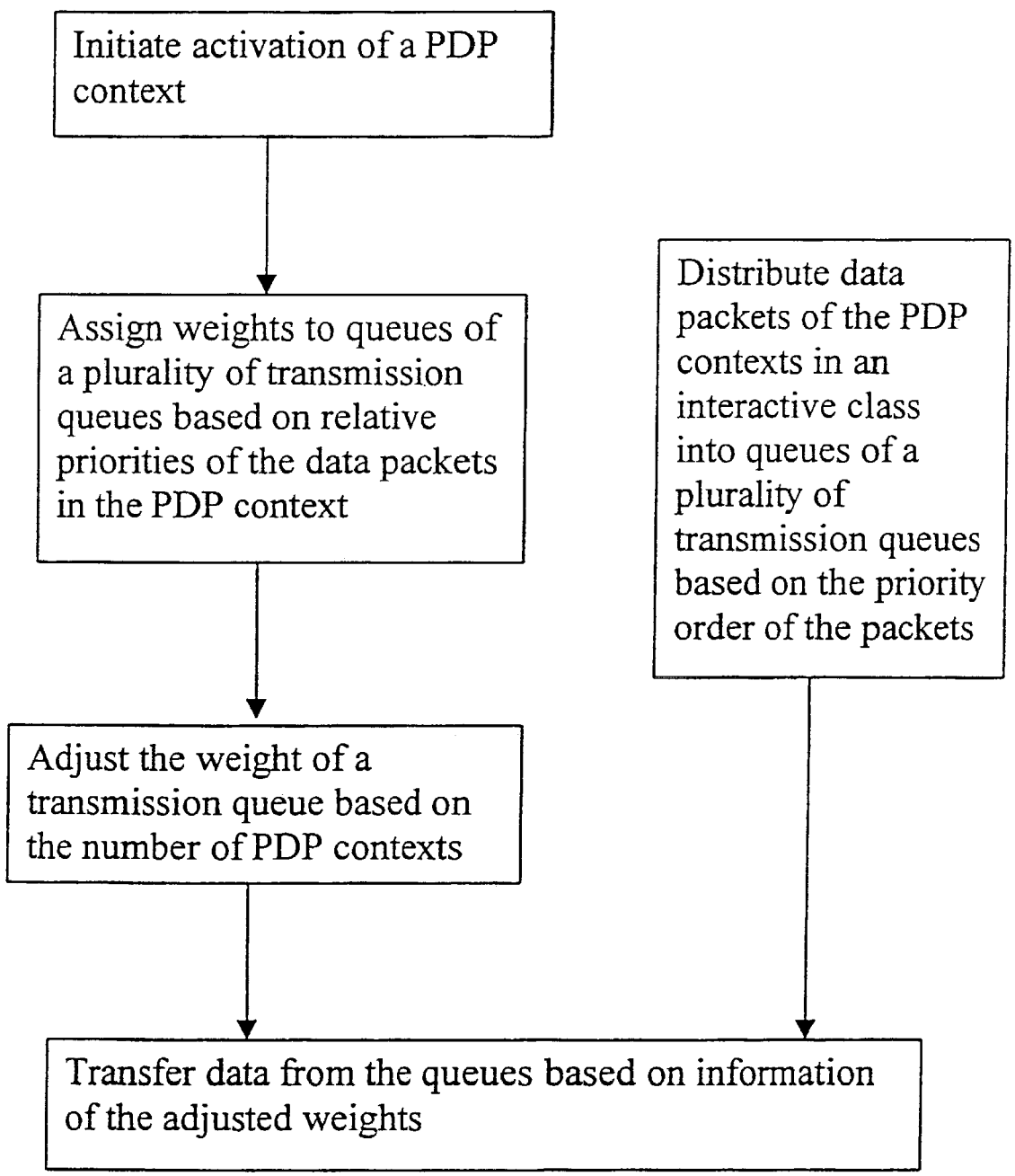
FIG. 3 is a flowchart illustrating the operation of one embodiment of the present invention.

Reference is made to FIG. 1 which shows a communication system in which the embodiments of the present invention may be employed. The system is capable of providing wireless packet switched services for a user 1 thereof. The area covered by the communication system may be divided into a plurality of cells or similar access entities (not shown) Each cell has associated therewith a base station 6. Depending on the standard being used by the network, the base station is sometimes referred to as node B, for example in the third generation standards. The term base station will be used in this-document to encompass all elements which transmit to wireless stations or the like via the air interface. A mobile station 1 i.e. the wireless user equipment is arranged to communicate with the respective base station. It should be appreciated that the term mobile stations is indented to cover any suitable type of wireless user equipment, such as portable data processing devices and web browsers.

The embodiment of the invention is described in the context of a UMTS (Universal Mobile Telecommunications System) and a GPRS (General Packet radio Service) and communications involving packet data. However, it should be appreciated that embodiments of the present invention are applicable to any other communication system which deals with packet data, non-packet data or even voice communication or the like, such as the IMT 2000, wireless LAN or different access networks.

The elements of a UMTS network system 2 will now be discussed in more detail. The mobile station or user equipment 1 is arranged to communicate via the air interface with a respective base station 6. The base station is controlled by a radio network controller RNC 7. The radio network controller RNC and the base station may sometimes be referred to as the radio network subsystem RNS 8 or radio access network RAN. It should be appreciated that a UMTS network is typically provided with more than one RNC, and that each radio network controller is arranged generally to control more than one base station 6 although only one base station is shown in FIG. 1. The elements of the RNS can be included in either or both of the RNC and the base station. This is an implementation issue.

The radio network subsystem 8 may be connected to a SGSN (serving GPRS support node) 14. The SGSN 14 keeps track of the mobile station's location and performs security functions and access control. The functions of the SGSN are defined in more detail e.g. in the 3GPP specification 23.060. The SGSN 14 is connected to a GGSN (gateway GPRS support node) 16. The GGSN 16 provides interworking with an external packet switched network 3. In other words, the GGSN 16 acts as a gateway between the UMTS network 2 and the external data network 3, such as an IP based data network. The functions of a typical GGSN are also defined in the referenced 3GPP specification.

Although not shown, the network system 2 may also be connected to conventional telecommunication networks, such as to a GSM based cellular public land mobile network (PLMN) or to a public switched telephone network (PSTN). The various networks may be interconnected to each other via appropriate interfaces and/or gateways.

Referring now also to FIGS. 2 and 3, the embodiments provide a method to differentiate the treatment of data packets of the total traffic 20 belonging to an interactive traffic class. The interactive traffic class may have various traffic handling priorities, FIG. 2 showing three different priority classes. The embodiments described in the following enable determination of a relative priority of a packet data protocol (PDP) context compared to other PDP contexts in the interactive traffic class. The following embodiment may be implemented in the GGSN 16 of FIG. 1, and more precisely, by means of a data processing unit 11 of the GGSN. However, it should be appreciated that the embodiment may also be applied in other network nodes of the network 2 as well, such as in the SGSN 14 and the RNC 7. The embodiments may also be applied in the mobile station 1.

In FIG. 2, separate send queues 21, 22 and 23 are assigned for each of the three traffic handling priorities in the interactive traffic class. The data packets are sent forward from the queues e.g. by using WFQ (Weighted Fair Queuing) method. The WFQ function 24 may be implemented such that the weights of the queues are configurable by the user of the network element (e.g. the operator of the network 2 or the user of the mobile station 1). The embodiments of the present invention enable dynamic adjustment of the weights of the queues in accordance with the number of the PDP contexts that are using the queues. The weights of the queues may be assigned and/or the dynamic changing of the weights is preferably implemented during the activation/deactivation of the PDP contexts i.e. the logical connections between the user 1 and the access point 16. By means of the dynamic adjustment of the weights the relative priorities of the data packets in the interactive traffic class may remain the same regardless of the number of the active PDP contexts.

The following considers situation where the user has configured the weights of the traffic handling priority queues 21-23 to be 5, 3, and 2, respectively. That is, if a same amount of PDP context is located in each of the traffic handling priority queues and each of the queues continuously contains queuing data packets, five packets may be firstly taken from the first queue 21, then three packets may be taken from the second queue 22, and finally two packets may be taken from the third queue 23, where after five packets may be taken from the first queue 21 and so on. The total output would be formed so that the data stream 21 having the highest priority would take up 50% of the traffic while the data stream 22 would take 30% and the data stream 3 would take 20% of the entire traffic 20.

However, if the number of the PDP contexts using each queue is not equal, the configured weights cannot be used as such, because they no longer reflect the relative priorities of the queues. For example, if the number of the PDP contexts in the traffic handling priority 21 is 100, the number of the PDP contexts in the traffic handling priority 22 is 10 and the number of the PDP contexts in the traffic handling priority 23 is 50, the outcome would be unfair for the users of the node, as the context with a lower priority may be transmitted before the packets with a higher priority. More particularly, the PDP context with traffic handling priority 22 would experience higher throughput than the PDP context with the traffic handling priority 21.

In accordance with the embodiments, this may be overcome by multiplying the configured weight by the number of the PDP contexts with the same traffic handling priority. In the above-mentioned example the effective weights would thus be in accordance with Table 1 below, wherein 'Priority W' designates the initial configured weight:

TABLE 1

|  | 1$^{st}$ Queue | 2$^{nd}$ Queue | 3$^{rd}$ Queue |
|---|---|---|---|
| Priority W | 5 | 3 | 2 |
| Contexts | 100 | 10 | 50 |
| Weights | 500 | 30 | 100 |

As can be seen from the above, the weight of the highest priority (1$^{st}$) queue would be 500, the weight of the medium priority (2$^{nd}$) queue would be 30 and the weight of the lowest priority (3$^{rd}$) queue would be 100, thereby reflecting the relative priorities of the queues. The weights are used so that the number of packets defined by the effective weight is taken sequentially from each queue in the priority order. That is, the data packet handling function 24 will transmit first 500 1$^{st}$ priority packets from the queue 21, followed by 30 2$^{nd}$ priority packets from queue 22 and 100 3$^{rd}$ priority packets from the queue 23.

If the queues contain a large number of PDP contexts and the distribution of the PDP contexts is substantially uneven, it may be that the WFQ 24 cannot function in the most efficient manner because the possibly substantially high values of the effective weights (the order of the weights may in some circumstances be even hundreds of thousands or even more). This may cause intolerable delays in the queues with lower priorities. A solution for this is use of e.g. a WF$^2$Q algorithm or similar capacity distribution scheme that evens the situation. A further embodiment of the invention discussed in the following aims to provide a more even distribution of the packets.

Lets assume that a great number packets are queuing for transmission in a node. The three queues 21 to 23 are weighted 5, 3 and 2, respectively. as is shown by Table 2 below.

TABLE 2

|  | 1st Queue | 2nd Queue | 3rd Queue |
| --- | --- | --- | --- |
| Priority W | 5 | 3 | 2 |
| Contexts | 100 000 | 10 000 | 1000 |
| Weights | 500 000 | 30 000 | 2000 |

The total number of data packets would be 532 000. The first queue forms a big "lump" of 500 000 packets, which may in some circumstances cause too long delay for the $2^{nd}$ and $3^{rd}$ queues. According to an embodiment the order of the transmission of the data packets is to randomly select the next data packet based on probabilities that are determined for each of the queues based on the assigned weights. The probabilities may be determined e.g. in the following manner. The probability that a data packet is selected from the $1^{st}$ queue is 500000/532000=0.940, from the $2^{nd}$ queue is 500000/532000=0.056, and from the $3^{rd}$ queue is 500000/532000=0.004. Over a longer period of time, the above scheme may provide an appropriate distribution of the bearer resources between the queues such that none of the queues experiences unreasonably long delays.

According to another possibility, the large "lumps" are split to smaller entities. This may be accomplished e.g. by dividing the weights by an appropriate integer, such as by 100 or 1000, thereby reducing the effective weights of the queues. If integer 1000 is used for the Table 2 example, this would lead to the following sequence of data packets: 500 from the $1^{st}$ queue, 30 from the $2^{nd}$ queue, 2 from the $3^{rd}$ queue, 500 from the $1^{st}$ queue and so on.

It should be appreciated that whilst embodiments of the present invention have been described in relation to the interactive class of the third generation GPRS and/or UMTS, the embodiments of the present invention are applicable to any other classes of any other appropriate standard. The logical connection may also sometimes be referred to as logical associations or bit pipes.

It is also noted herein that while the above describes exemplifying embodiments of the invention, there are several variations and modifications which may be made to the disclosed solution without departing from the scope of the present invention as defined in the appended claims.

The invention claimed is:

1. A method of handling a plurality of data units in a node of a communication system, wherein the plurality of data units are distributed in the node in a plurality of transmission queues based on priority parameters of the data units, the method comprising:
   assigning weights to the queues of the plurality of transmission queues, the weight of a queue defining a share of resources that is to be allocated for the queue;
   adjusting the assigned weight of a queue of the plurality of transmission queues based on information of an amount of logical connections that associate with said queue; and
   transferring data units from the queues based on the adjusted weights, wherein the adjusting is accomplished by multiplying the weight of the queue by the number of logical connections that associate with said queue.

2. A method as claimed in claim 1, wherein the method further comprises a quality of service feature of the communication system which defines a plurality of traffic classes, and wherein the transmission queues belong to an interactive traffic class of said plurality of traffic classes.

3. A method as claimed in claim 1, wherein the weights are assigned to the queues based on a weighted fair queuing scheme.

4. A method as claimed in claim 1, wherein the number of data units that is to be transferred from a queue is based on a relative weight of the queue.

5. A method as claimed in claim 1, wherein the adjusted weight of a queue of the plurality of transmission queues indicates the number of data units that is to be transferred from said queue before transferring data units from a next queue.

6. A method as claimed in claim 1, wherein data is transferred from the queues based on probabilities that are computed based on information of the adjusted weights of the respective queues and a total amount of data to be transferred.

7. A method as claimed in claim 1, wherein the weights are adjusted dynamically.

8. A method as claimed in claim 7, wherein the weights are adjusted during activation or deactivation of logical connections.

9. A method as claimed in claim 1, wherein the communication system comprises a first packet switched network that provides wireless services for wireless stations and a second packet switched network, and wherein the data units are to be transmitted between the first and the second packet switched networks.

10. A method as claimed in claim 1, wherein the node comprises one of the following: a gateway between two communication networks; a control node of communication network; a control node of a radio access network; a wireless station.

11. A method of handling a plurality of data units in a node of a communication system, wherein the plurality of data units are distributed in the node in a plurality of transmission queues based on priority parameters of the data units, the method comprising:
    assigning weights to the queues of the plurality of transmission queues, the weight of a queue defining a share of resources that is to be allocated for the queue;
    adjusting the assigned weight of a queue of the plurality of transmission queues based on information of an amount of logical connections that associate with said queue; and
    transferring data units from the queues based on the adjusted weights,
    wherein the adjusted weight of a queue of the plurality of transmission queues indicates the number of data units that is to be transferred from said queue before transferring data units from a next queue and wherein a transmission sequence of the queues is based on the priority parameters.

12. A method of handling a plurality of data units in a node of a communication system, wherein the plurality of data units are distributed in the node in a plurality of transmission queues based on priority parameters of the data units, the method comprising:
    assigning weights to the queues of the plurality of transmission queues, the weight of a queue defining a share of resources that is to be allocated for the queue;
    adjusting the assigned weight of a queue of the plurality of transmission queues based on information of an amount of logical connections that associate with said queue; and
    transferring data units from the queues based on the adjusted weights, wherein the weights are divided by an integer, and the number of data units that is to be transferred from a queue is based on a relative value obtained by the division.

13. A node for a communication system, comprising:
means for receiving a stream of data units, the data units associating with different priorities;
means for distributing the data units into a plurality of transmission queues based on the priorities of the data units;
means for assigning weights for the transmission queues, the weight of a queue defining a share of resources to be allocated for the queue; and
means for adjusting the weight assigned to a queue based on information of the amount of logical connections that associate with the queue, wherein the node is adapted to transfer data units from the queues based on the adjusted weights, wherein the means for adjusting the weights are adapted to multiply the weight assigned for the queue by the number of logical connections that have the corresponding priority.

14. A node as claimed in claim 13, wherein the transmission queues belong to an interactive traffic class of the quality of service classes.

15. A node as claimed in claim 13, wherein the means for adjusting the weights are adapted to adjust the weights dynamically.

16. A node as claimed in claim 13, wherein the communication system comprises a first packet switched network that provides wireless services for wireless stations and a second packet switched network, and wherein the data units are to be transmitted between the first and the second packet switched networks.

17. A node as claimed in claim 13, wherein the node comprises one of the following:
a gateway between two communication networks;
a control node of a communication network; and
a control node of a radio access network; a wireless station.

18. A node for a communication system, comprising:
a receiver configured to receive a stream of data units, the data units associating with different priorities;
a plurality of transmission queues;
a distributor configured for distributing the data units into the plurality of transmission queues based on the priorities of the data units;
an assigner configured for assigning weights for the plurality of transmission queues, the weight of a queue defining the share of resources to be allocated for the queue; and
an adjustor configured for adjusting the weight assigned to a queue based on information of the amount of logical connections that associate with the queue, wherein the node is configured to transfer data units from the queues based on the adjusted weights, wherein the adjustor is configured to multiply the weight assigned for the queue by the number of logical connections that have the corresponding priority.

19. The node as claimed in claim 18, wherein the transmission queues belong to an interactive traffic class of the quality of service classes.

20. The node as claimed in claim 18, wherein the adjustors are adapted to adjust the weights dynamically.

21. The node as claimed in claim 18, wherein the communication system comprises a first packet switched network that provides wireless services for wireless stations and a second packet switched network, and wherein the data units are to be transmitted between the first and the second packet switched networks.

22. The node as claimed in claim 18, wherein the node comprises one of the following: a gateway between two communication networks; a control node of communication network; a control node of a radio access network; and a wireless station.

* * * * *